US008571018B2

(12) United States Patent
O'Connor

(10) Patent No.: US 8,571,018 B2
(45) Date of Patent: *Oct. 29, 2013

(54) SONET ADD/DROP MULTIPLEXER WITH PACKET OVER SONET CAPABILITY

(75) Inventor: Donald O'Connor, McKinney, TX (US)

(73) Assignee: Fujitsu Limited, Kawasaki-shi (JP)

( * ) Notice: Subject to any disclaimer, the term of this patent is extended or adjusted under 35 U.S.C. 154(b) by 936 days.

This patent is subject to a terminal disclaimer.

(21) Appl. No.: 11/776,644

(22) Filed: Jul. 12, 2007

(65) Prior Publication Data

US 2007/0253408 A1 Nov. 1, 2007

Related U.S. Application Data

(60) Division of application No. 10/067,725, filed on Feb. 4, 2002, now Pat. No. 7,257,113, which is a continuation of application No. 09/303,428, filed on May 3, 1999, now Pat. No. 6,356,544.

(51) Int. Cl.
H04L 12/64 (2006.01)

(52) U.S. Cl.
USPC .......................................... 370/353; 370/477

(58) Field of Classification Search
USPC ......... 370/353, 238, 400, 392, 466, 401, 487, 370/461, 352, 477; 709/220–222, 227, 218
See application file for complete search history.

(56) References Cited

U.S. PATENT DOCUMENTS

| 5,677,905 A | 10/1997 | Bigham et al. | |
| 5,684,799 A | 11/1997 | Bigham et al. | 370/352 |
| 5,953,338 A | 9/1999 | Ma et al. | 370/395 |
| 5,982,767 A | 11/1999 | McIntosh | 370/352 |
| 5,986,783 A | 11/1999 | Sharma et al. | 398/59 |
| 6,031,838 A | 2/2000 | Okabe et al. | 370/395 |
| 6,111,673 A | 8/2000 | Chang et al. | 398/79 |
| 6,205,488 B1 * | 3/2001 | Casey et al. | 709/238 |
| 6,222,848 B1 | 4/2001 | Hayward et al. | 370/412 |
| 6,301,254 B1 | 10/2001 | Chan et al. | 370/397 |
| 6,356,544 B1 * | 3/2002 | O'Connor | 370/353 |
| 6,408,001 B1 * | 6/2002 | Chuah et al. | 370/392 |
| 6,438,612 B1 | 8/2002 | Yionen et al. | 709/249 |
| 6,470,018 B1 | 10/2002 | Wiley et al. | 370/396 |
| 6,563,793 B1 * | 5/2003 | Golden et al. | 370/236 |
| 6,628,617 B1 * | 9/2003 | Karol et al. | 370/237 |
| 6,788,681 B1 * | 9/2004 | Hurren et al. | 370/389 |
| 6,826,196 B1 * | 11/2004 | Lawrence | 370/466 |

(Continued)

FOREIGN PATENT DOCUMENTS

EP 1 209 407 A 8/2000

OTHER PUBLICATIONS

Supplementary European Search Report; Application No./Patent No. 08004236.9-1249, EP 08 00 4236, Applicant: Fujitsu Limited, 9 pages, Jun. 2, 2008.

(Continued)

Primary Examiner — Michael J Moore, Jr.
(74) Attorney, Agent, or Firm — Baker Botts L.L.P.

(57) ABSTRACT

An advanced SONET add/drop multiplexer capable of supporting packet over SONET and multiprotocol label switching. The add/drop multiplexer is capable of adding and/or dropping both STM and packet traffic, such as Internet Protocol traffic. This SONET add/drop multiplexer allows Internet Protocol streams which are added or dropped at different nodes to be carried over the same SONET path in a network, thereby greatly saving bandwidth.

13 Claims, 3 Drawing Sheets

(56) References Cited

U.S. PATENT DOCUMENTS

| | | | | |
|---|---|---|---|---|
| 6,963,561 | B1 | 11/2005 | Lahat | 370/356 |
| 7,039,687 | B1 * | 5/2006 | Jamieson et al. | 709/220 |
| 7,151,741 | B1 * | 12/2006 | Elliot et al. | 370/218 |
| 7,257,113 | B2 * | 8/2007 | O'Connor | 370/353 |
| 2006/0007946 | A1 * | 1/2006 | Kastenholz et al. | 370/401 |

OTHER PUBLICATIONS

Wu et al., "MPLS Support of Differentiated Services by ATM LSRs and Frame Relay LSRs," draft-wu-mpls-diff-ext-01-txt, Network Working Group, Internet Draft, pp. 1-11, Feb. 1999.

Supplementary Partial European Search Report; Application No./ Patent No. 00930261.3-2416 PCT/US0011727; Applicant: Fujitsu Limited, May 7, 2006.

Wu, Liwen et al., Alcatel, "MPLS Support of Differentiated Services by ATM LSRs and Frame Relay LSRs; draft-wu-mpls-diff-ext-01. txt", Internet Engineering Task Force, IETF, Ch. 1, 11 pages, Feb. 1, 1999.

International Search Report, Application No. EP 09169775.5, 6 pages, Oct. 13, 2009.

International Search Report, Application No. EP 09169748.2, 5 pages, Oct. 22, 2009.

* cited by examiner

SONET ADD/DROP MULTIPLEXER WITH PACKET OVER SONET CAPABILITY

CROSS-REFERENCE TO RELATED APPLICATION

This application is a divisional application of U.S. application Ser. No. 10/067,725, filed Feb. 4, 2002 and entitled "Sonet Add/Drop Multiplexer With Packet Over Sonet Capability" which is a continuation of U.S. application Ser. No. 09/303,428, filed May 3, 1999, by Donald O'Connor and entitled "Sonet Add/Drop Multiplexer With Packet Over Sonet Capability", now U.S. Pat. No. 6,356,544.

TECHNICAL FIELD OF THE INVENTION

The present invention relates generally to a SONET add/drop multiplexer enhanced so as to support Packet over SONET (POS) and Multiprotocol Label Switching (MPLS). Such a device will allow packet traffic, such as Internet Protocol traffic, which is added to and/or dropped from various points in a SONET network to be carried over the same SONET path on the network.

BACKGROUND ART

Traditionally telephony networks have been synchronous in nature. They were initially constructed for the purpose of carrying narrowband voice signals, as wideband and broadband traffic, such as data and video, did not exist. Today, both network operators and equipment vendors face the challenge of handling wideband and broadband traffic with an infrastructure that is essentially inadequate because it was not designed for this purpose.

With the proliferation of the Internet and the integration of Internet traffic onto telephony networks, the networks are now dealing with large volumes of data traffic. As the Internet grows and more Internet service providers arise, telephony service providers and Internet service providers are investing more money in capital equipment in order to provide more bandwidth and paths for the Internet service traffic to flow.

One way Internet Protocol data could be routed in through a telephony network is over an ATM network. However, such a method of transmission of Internet Protocol data is inefficient due to cell header, packet-to-cell adaptation and encapsulation overhead.

Another method of routing Internet Protocol data is over a SONET network. Traditionally, if an Internet service provider point of presence would be connected into a SONET network, it would be through a device such as an add/drop multiplexer. If that Internet service provider point of presence was to be connected to another Internet service provider point of presence, a dedicated STS link within the SONET network would need to be established between the two points of presence. As more and more Internet service providers are added to such a network, the number of dedicated STS links dramatically increases, causing allocation of network bandwidth to become very inefficient.

Recently, the Internet Engineering Task Force approved a draft of a new standard known as Multiprotocol Label Switching (MPLS). MPLS attempts to merge layer 2 and layer 3 data switching. Under MPLS, an edge node converts regular packets into an MPLS format. The edge node also handles priority. Core nodes, however, do not need to look deeper then the assigned label to perform a switching function. This speeds up the switching process because the core nodes no longer need to look at a packet's source and destination address and priority. The draft MPLS standards are available to the public for download from the Internet at www.ietf.cnri.reston.va.us/1D.html. Currently available drafts include 1) draft-ietf-mpls-arch-04.txt; 2) draft-ietf-mpls-framework-02.txt, 3) draft-ietf-mpls-label-emcaps-03.txt; 4) draft-ietf-mpls-fr-03.txt; 5) draft-ietf-mpls-ldp-03.txt; 6) draft-ietf-mpls-ldp-03.txt; 7) draft-ietf-mpls-rsvp-ldp-tunnel-01.txt; and 8) draft-ietf-mpls-bgp4-mpls-02.txt. Each of these draft MPLS standards is hereby incorporated by reference.

MPLS offers the Internet service provider community the ability to offer different grades of service. It also provides the ability to create virtual private networks through the stacking of labels. For instance, one label can designate a particular company, while a sub-label can indicate a specific group of users within that company. MPLS also makes it easier for Internet service providers to perform traffic engineering by permitting Internet service providers to explicitly route certain labels to alleviate congestion.

However, the MPLS standards do not address integration of MPLS switching into a SONET network.

SUMMARY OF THE INVENTION

The present invention provides an apparatus and method for efficiently utilizing bandwidth within a SONET network carrying data packets such as Internet Protocol packets. The invention does so by providing packet switching capability within SONET add/drop multiplexers.

An embodiment of the present invention provides for the inclusion of MPLS switching capability within a SONET add/drop multiplexer.

Another embodiment of the present invention provides for the inclusion of packet switching capability within a SONET add/drop multiplexer along with ATM switching capability.

Another embodiment of the present invention provides for the inclusion of edge node service adaptation functionality within a SONET add/drop multiplexer.

Thus, it is an object of the present invention to optimize allocation of SONET transport bandwidth carrying packet traffic.

It is a further object of the present invention to provide the ability to offer different grades of packet traffic service in a SONET network.

It is another object of an embodiment of the present invention to provide the ability to create virtual private networks over a SONET network.

It is a further object of embodiment of the present invention to provide the ability to perform traffic engineering in a SONET network carrying packet traffic.

It is another object of the present invention to reduce capital costs for Internet service providers connecting to SONET networks.

It is a further object of the present invention to reduce the amount of state information that must be maintained in a SONET network.

BRIEF DESCRIPTION OF THE DRAWINGS

These and other objects and advantages of this invention will become more apparent and more readily appreciated by reference to the description of the preferred embodiments, taken in conjunction with the accompanying drawings, of which.

DETAILED DESCRIPTION OF PREFERRED EMBODIMENTS

The present invention will be better understood by reference to the accompanying drawings.

Figure 1:
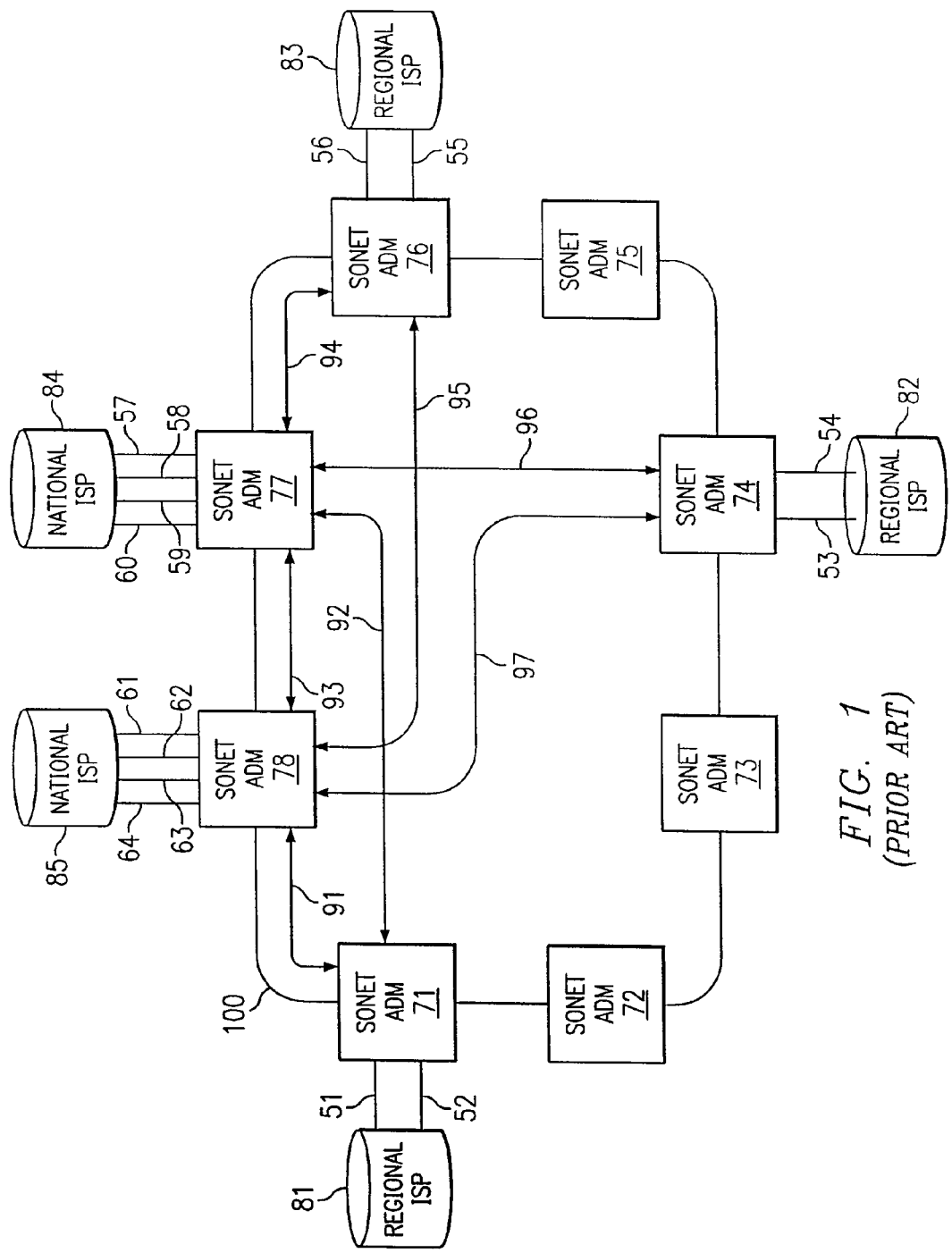
FIG. 1 (Prior Art) is a block diagram of a SONET network carrying packet traffic of the prior art.

FIG. 1 (prior art) depicts a SONET network consisting of SONET add/drop multiplexers 71 through 78, regional Internet service provider points of presence 81 through 83, and national Internet service provider points of presence 84 and 85 of the prior art. Under the prior art, if each local Internet service provider point of presence was to be connected to both of the national Internet service provider points of presence, and the two national Internet service provider points of presence were to be 5 interconnected, then 7 separate STS links within the SONET network would have to be dedicated to carrying the packet traffic between the various Internet service providers.

For example, to connect regional Internet service provider point of presence 81 to national Internet service provider point of presence 85, add/drop multiplexer 71 would have to connect input 51 from regional Internet service provider 81 to add/drop multiplexer 78 through dedicated STS link 91. Add/drop multiplexer 78 would then have to connect dedicated STS link 91 to line 61 to connect it to the national Internet service provider 85. To connect regional Internet service provider 81 to national Internet service provider 84, add/drop multiplexer 71 would have to connect input 52 to add/drop multiplexer 77 through dedicated STS link 92. Add/drop multiplexer 77 would then have to connect STS link 92 to national Internet service provider 84 through line 60.

To connect regional Internet service provider 82 to national Internet service provider 85, add/drop multiplexer 74 would have to connect input line 53 to add/drop multiplexer 78 through dedicated STS link 97. Add/drop multiplexer 78 would then have to connect dedicated STS link 97 to line 62. To connect regional Internet service provider 82 to national Internet service provider 84, add/drop multiplexer 74 would have to connect input line 54 to add/drop multiplexer 77 through dedicated STS link 96. Add/drop multiplexer 77 would then have to connect dedicated STS link 96 to input line 59.

To connect regional Internet service provider 83 to national Internet service provider 85, add/drop multiplexer 76 would have to connect input line 55 to add/drop multiplexer 78 through dedicated STS link 95. Add/drop multiplexer 78 would then have to connect dedicated STS link 95 to input line 63. To connect regional Internet service provider 83 to national Internet service provider 84, add/drop multiplexer 76 would have to connect input line 56 to add/drop multiplexer 77 via dedicated STS link 94. Add/drop multiplexer 77 would then have to connect dedicated STS link 94 to line 58.

To connect the two national Internet service providers 84 and 85 to each other, add/drop multiplexer 78 would have to connect input line 64 to add/drop multiplexer 77 via dedicated STS link 93. Add/drop multiplexer 77 would then have to connect dedicated STS link 93 to input line 57.

It doesn't take too many Internet service providers to make this SONET network of the prior art very inefficient. Moreover, an expensive IP switch port would be necessary for each of the connections. Thus, two IP switch ports would be necessary at each of the regional Internet service provider points of presence 81 through 83 and four IP switch ports would be necessary at each of the national Internet service provider points of presence 84 and 85.

Figure 2:
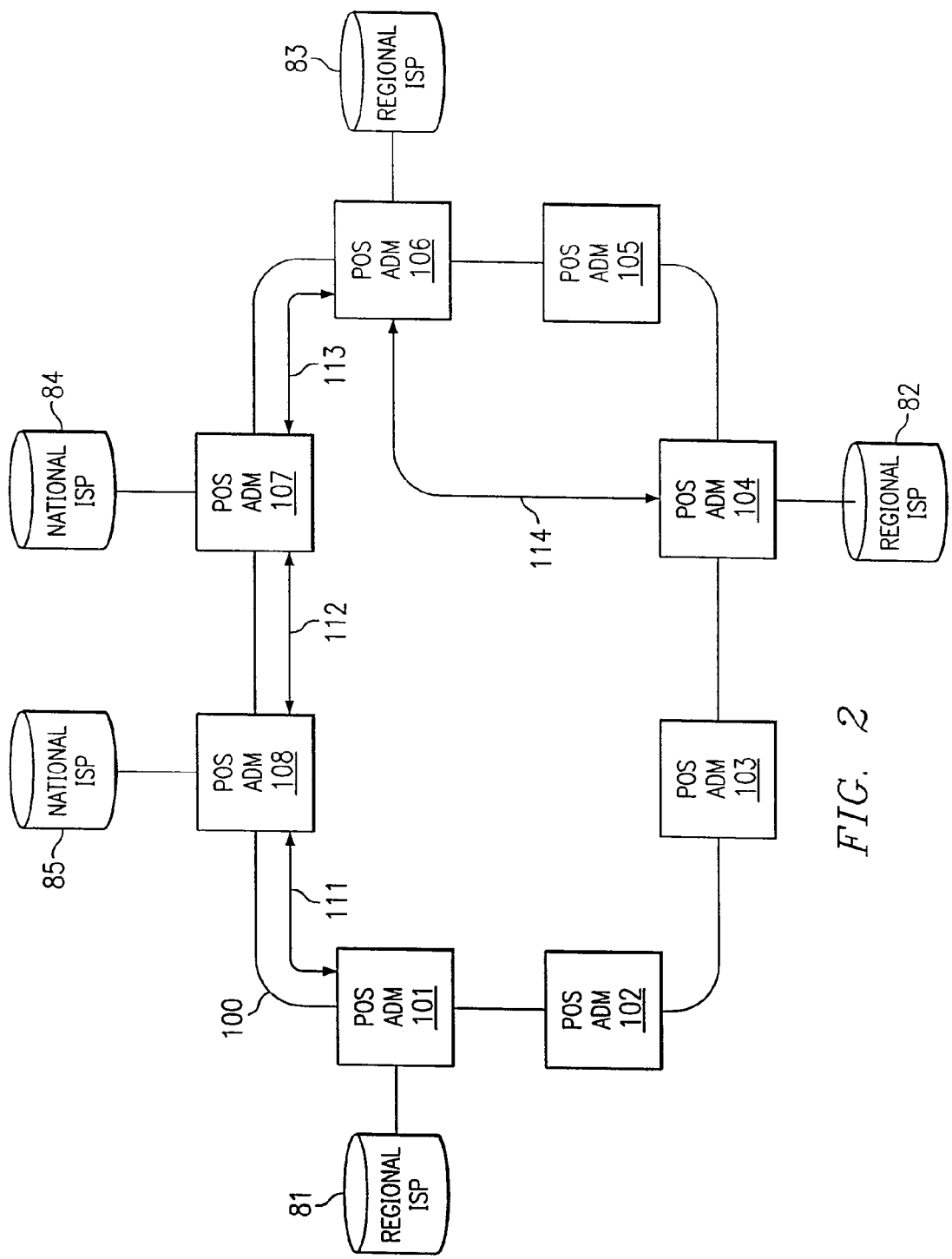
FIG. 2 is a block diagram according to an embodiment of the present invention of a SONET network.

In FIG. 2, a SONET network according to an embodiment of present invention is shown. In this figure, at least SONET add/drop multiplexers 101, 104, 106, 107 and 108 are equipped with POS/MPLS capability. This enables the add/drop multiplexers to process labels and concentrate label switch paths into a single STS path between the add/drop multiplexer nodes. Add/drop multiplexers 102, 103, and 105 may be of the traditional type or may include the MPLS capability. Preferably, each of the add/drop multiplexers would include this capability to enable Internet service providers to connect directly to add/drop multiplexers 102, 103 and 105 in the future. By including POS/MPLS capability in SONET add/drop multiplexers 101, 104, 106, 107 and 108, a single STS link between each of the nodes can be devoted to carrying packet data. This STS link would flow along the path of 111, 112, 113 and 114. The MPLS labels with PPP or frame relay encapsulation would define virtual circuits over the SONET network. SONET add/drop multiplexers 101, 104, 106, 107 and 108 can then concentrate/groom the MPLS label delineated virtual circuits onto a common SONET transport path. Additionally, communications between the Internet service provider points of presence and their respective add/drop multiplexers can now be combined into one respective pipe. This reduces the number of IP switch ports required at each Internet service provider point presence down to one.

Traditional engineering methods can be utilized by one skilled in the art to design POS/MPLS capability into a SONET add/drop multiplexer.

Although it is preferable to provide POS/MPLS capability within the SONET add/drop multiplexer, similar savings can be realized in bandwidth and switch port costs without utilizing MPLS. For instance, if layer 2 encapsulation is frame relay, then the SONET add/drop multiplexer can utilize the frame relay address (DLCI) field to delineate virtual circuits for concentration into the common STS path 111, 112, 113 and 114.

An additional benefit of providing POS/MPLS capability within the SONET add/drop multiplexer is that MPLS label switched paths can be merged to form multipoint-to-point trees. This reduces the amount of state information that must be maintained by the network.

Preferably, the SONET add/drop multiplexers of the present invention would each contain a route processor that would run standard IP routing protocols such as OSPF, BGP, and multicast (e.g. PIM) as well as label distribution protocols, such as LDP. Additionally, the SONET add/drop multiplexers would contain interfaces for Ethernet, IDS 3, OC-3, OC-12, and others. The SONET add/drop multiplexers of the present invention may also contain an ATM switching fabric in order to switch ATM traffic that may be present on the SONET network. Again, traditional engineering methods can be used by those skilled in the art to build such devices.

Figure 3:
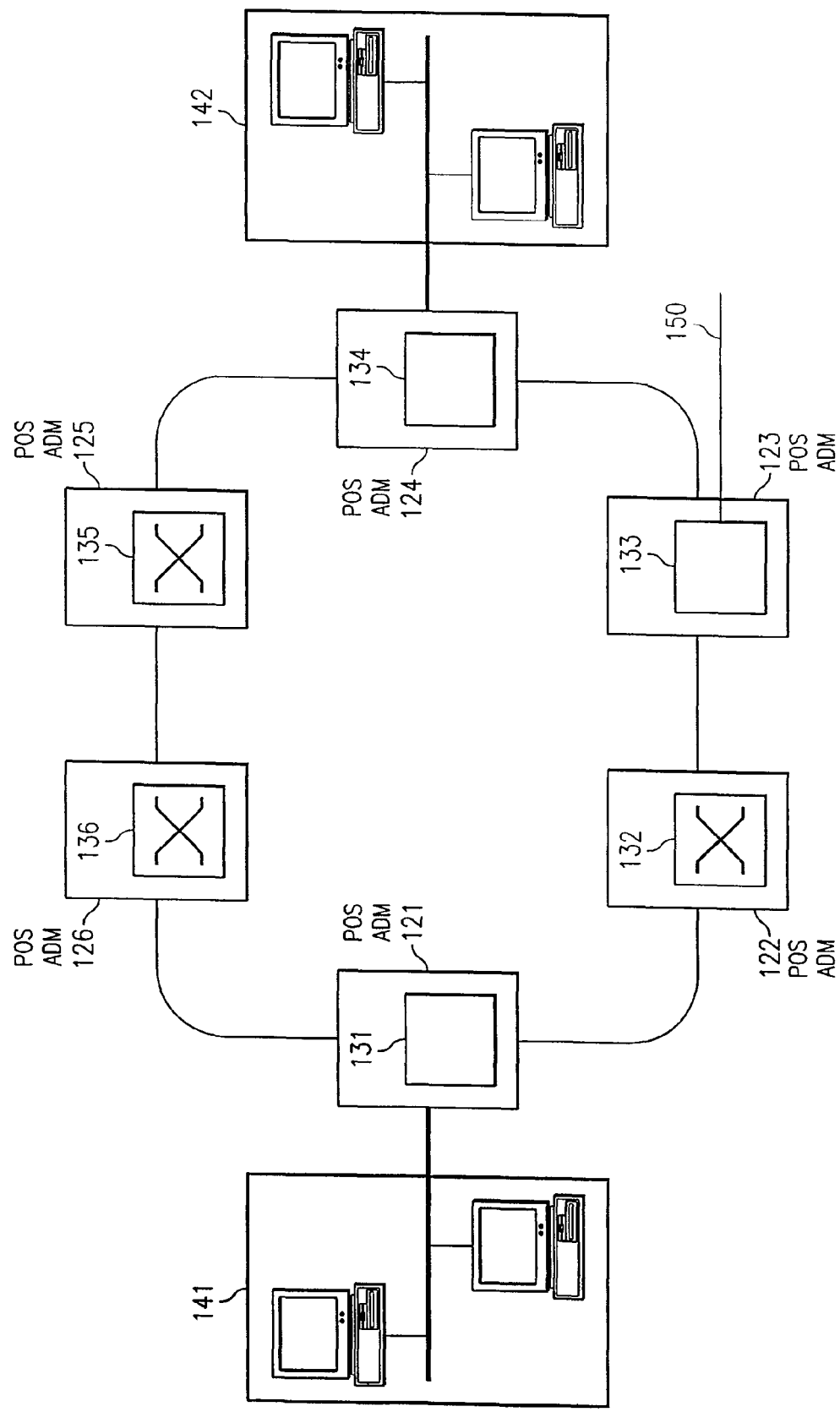
FIG. 3 is a block diagram of a SONET network according to an embodiment of the present invention.

FIG. 3 depicts a SONET network according to an embodiment of present invention. In this figure, edge node service adaptation function has been incorporated into the POS/MPLS add/drop multiplexer. As can be seen in FIG. 3, SONET add/drop multiplexers 121, 123, and 124 have MPLS router functions built into them, 131, 133 and 134 respectively. SONET add/drop multiplexers 122, 125 and 126 have MPLS functionality as discussed previously. This functionality enables them to label switch. By providing MPLS edge router functionality in SONET add/drop multiplexers 121, 123 and 124, computer network 141 and computer network 142 can be connected in a virtual private network. Additionally, computer networks 141 and 142 can access the Internet through line 150 to an Internet service provider (not shown). Such devices can be built by those skilled in the art using traditional engineering methods.

Although each of the preferred embodiments discussed above was discussed with reference to a SONET network, the same may be applicable to an SDH network or any other synchronous optical network.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A method for supporting packet communications in a synchronous optical network, the method comprising:
   receiving a packet data at a synchronous optical network element; and
   switching the packet data to a path which provides an optical link between the synchronous optical network element and a remote synchronous optical network element;
   wherein the switching is made under a multiprotocol label switching to concentrate a plurality of label switched paths to a concentrated path and provides a virtual private network over the synchronous optical network.

2. The method of claim 1, wherein receiving comprises receiving the packet data using a LAN port of the synchronous optical network element.

3. The method of claim 2, wherein the virtual private network links the LAN port of the synchronous optical network element and a LAN port of the remote synchronous optical network element.

4. The method of claim 1, wherein a multiprotocol label switching (MPLS) router delineates a plurality of MPLS paths for the virtual private network.

5. The method of claim 1, further comprising:
   routing the packet data based on label information distributed using label distribution protocol (LDP);
   wherein the multiprotocol label switching provides a plurality of virtual private networks over the synchronous optical network.

6. The method of claim 1, wherein the path comprises an optical synchronous transport signal link between the synchronous optical network element and the remote synchronous optical network element.

7. A node in a synchronous optical network, comprising:
   a local area network (LAN) interface configured to receive a packet data;
   a time division multiplexer operable to couple the LAN interface to the synchronous optical network; and,
   a multiprotocol label switching (MPLS) router operable to switch the packet data from the LAN interface to a path across the synchronous optical network and to provide a virtual private network over the synchronous optical network, wherein the switching is made under a multiprotocol label switching to concentrate a plurality of label switched paths to a concentrated path.

8. The node of claim 7, wherein the path provides an optical link between the node and another node coupled to the synchronous optical network for transmitting the packet data as MPLS traffic.

9. The node of claim 7, wherein the virtual private network links a LAN port of the LAN interface to another LAN port of another node coupled to the synchronous optical network.

10. The node of claim 7, wherein the MPLS router delineates a plurality of MPLS paths for the virtual private network.

11. A synchronous optical network element comprising:
    an Ethernet local area network (LAN) interface operable to receive packet data for a plurality of label switched paths;
    a synchronous optical add/drop multiplexer configured to couple a LAN interface to a synchronous optical network; and,
    a multiprotocol label switch (MPLS) router operable to switch the packet data from the LAN interface to a path across the synchronous optical network and to provide a virtual private network over the synchronous optical network, wherein the switching is made under a multiprotocol label switching to concentrate a plurality of label switched paths to a concentrated path.

12. The synchronous optical network of claim 11,
    wherein the path provides an optical link between a synchronous optical network element and a remote synchronous optical network element for transmitting the packet data as MPLS traffic; and
    wherein the virtual private network links the LAN interface to another LAN interface of the remote synchronous optical network element.

13. The synchronous optical network element of claim 11, wherein the MPLS router delineates a label switched path for the virtual private network.

* * * * *